CLIPPING AMPLIFIERS

Filed June 27, 1951 2 Sheets-Sheet 1

INVENTORS
THOMAS C. WISENBAKER
MARTIN R. RICHMOND
BENJAMIN R. COLE
BY [signature]
ATTORNEY INVENTORS
THOMAS C. WISENBAKER
MARTIN R. RICHMOND
BENJAMIN R. COLE
BY Elmer J. Gorn
ATTORNEY United States Patent Office 2,739,191

Patented Mar. 20, 1956

2,739,191

CLIPPING AMPLIFIERS

Thomas C. Wisenbaker, Woodland Hills, Calif., and Martin R. Richmond, Cambridge, and Benjamin R. Cole, Waltham, Mass., assignors to Raytheon Manufacturing Company, Newton, Mass., a corporation of Delaware Application June 27, 1951, Serial No. 233,856

2 Claims. (Cl. 179—171)

This invention relates to clipping amplifiers and more particularly to those used to increase the percentage of modulation of a modulated radio frequency signal.

In certain applications it is necessary to amplify and later detect modulated carriers where the carrier is present in considerably greater strength than the modulation side bands. The percentage modulation in such cases may be less than one hundredth of one per cent. With such slight modulation side bands in the presence of a strong carrier, a slight amount of limiting action will strip off the amplitude side bands. Also it is obvious that such a small degree of modulation will be more subject to distortion from noise generated in subsequent stages than signals modulated to a greater degree, and also that such slightly modulated signals will be more difficult to accurately detect.

By the present invention, this difficulty is overcome by increasing the percentage of modulation at the earliest feasible point in the receiving system. In most cases, this will be the first and successive stages of intermediate frequency amplification at which limiting might occur.

By the present invention, this increase in percentage modulation is accomplished by adjusting the amplifier so that the most positive portion of the signal envelope is amplified, and the larger negative portion of the envelope is rejected. This can be done by biasing the grid beyond cutoff, preferably by cathode biasing. It can also be done by placing a rectifier in the grid circuit. If two such stages are arranged in push-pull, the useful portion of the complete envelope is retained. The symmetrical envelope is recovered by placing a resonant circuit tuned to the frequency of the carrier in the plate circuit of the amplifier. The resulting modulated signal will be much more deeply modulated and less subject to distortion in subsequent stages of the receiver. For instance, if the original modulation were one per cent., and all but five per cent. of the positive alternations were clipped off, the modulation would represent twenty per cent. of the remaining five per cent. The symmetrically modulated carrier is recreated in the plate-tuned circuit. The result is a gain of twenty times or twenty-six decibels in percentage of modulation.

Other and further advantages of this invention will be apparent as the description thereof progresses, reference being had to the accompanying drawings, wherein.

Figure 1:
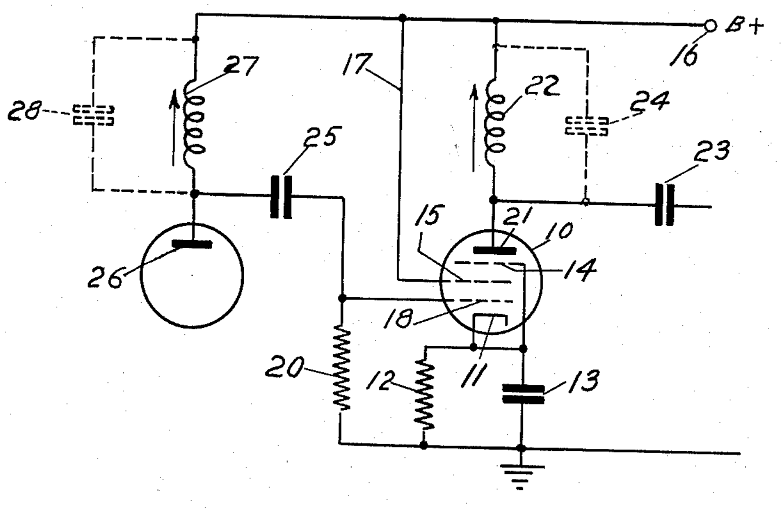
Fig. 1 is a schematic diagram of the preferred embodiment of the invention.

In Fig. 1 reference numeral 10 represents an amplifier tube, in this case a pentode, with its cathode 11 connected to ground over a resistor 12 and a capacitor 13. The suppressor grid 14 is connected to the cathode 11. The screen grid 15 is connected to a source of positive potential at terminal 16 by wire 17. The grid 18 is connected to ground through a resistor 20. The plate 21 is connected to the terminal 16 through a tuned inductance 22 and is also coupled to the following stage through the capacitor 23. The stray capacity in the circuit of plate 21 is represented by the capacitor 24 shown in dotted lines. This forms the tuned circuit for the plate 21 with the inductance 22. The input signal is coupled to the grid 18 of the tube 10 through a capacitor 25 from the plate 26 of the preceding stage which is also connected to terminal 16 through a variable inductance 27. The stray capacitance of this plate circuit is represented by the capacitor 28 shown in dotted lines.

Figure 2:
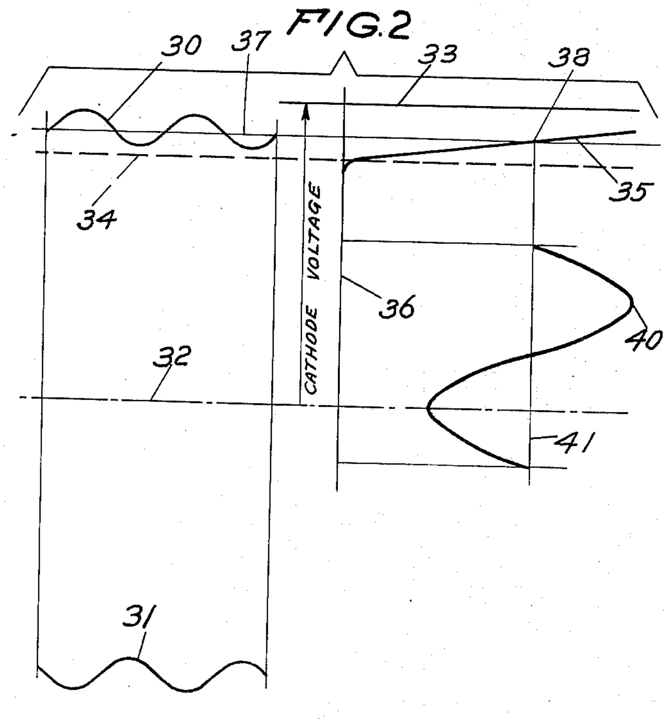
Fig. 2 is a graph illustrating the principle of the invention.
Figure 3:
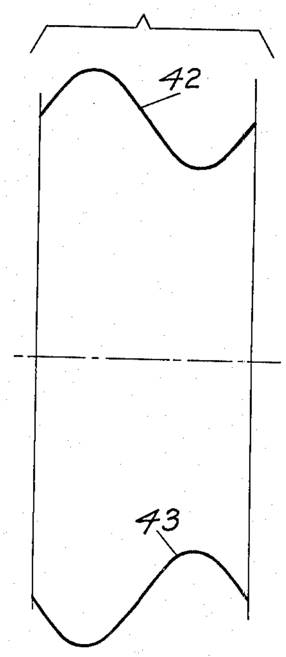
Fig. 3 is a graph of the modulated carrier produced by the circuit of the invention.

The operation of this circuit can best be understood by reference to the graphs of Figs. 2 and 3. The amplitude envelope of the incoming amplitude modulated signal is represented by the lines 30 and 31. The voltage reference of the signal on the input is represented by the line 32. The relative amplitude of the modulation to the carrier amplitude is exaggerated for the sake of clarity. In the following description it will be assumed to be one per cent. of the carrier amplitude. The cathode potential is represented by line 33. This is considerably positive with respect to ground, represented by the line 32, due to the voltage drop through the resistor 12 to produce the grid to cathode potential difference represented by the line 34.

The grid voltage-plate current characteristic of the tube 10 is represented by the line 35. This graph is seen to start at the cut-off point where the zero plate current line 36 intersects the grid bias line 34. The effect of this bias is to cut off all but the upper portion of the modulated signal, five per cent in this example.

The modulation envelope of the signal, represented by the line 30, will be seen to vary about an average carrier value, represented by the line 37. This can be taken as the operating point 38 on the characteristic curve 35. As a result, the plate current will vary in the manner shown in the graph 40 about a reference value, represented by the line 41. This modulation represents twenty per cent of the average plate current.

This signal is actually a series of pulses and, when applied to the tuned circuit formed by the inductance 22 and the stray capacitance 24 of the circuit associated with the plate 21 of the tube 10, a modulated signal of the original carrier frequency with the symmetrical envelope, shown by the lines 42 and 43, will be coupled through the capacitor 23 to the next stage. The symmetrical amplitude modulation is equal to the plate current pulse modulation shown in Fig. 2, in this case twenty per cent. This represents an increase in the modulation by a factor of twenty from one percent to twenty per cent in the example chosen. This modulation percentage increase can be increased still further by cascading several stages. The effect of such further stages is to add no gain to the carrier while amplifying the modulation signal by half the amount to be expected with a small carrier present due to the rejection of the negative half of the envelope. The purpose of the capacitor 13 in the cathode circuit of the tube 10 is to hold cathode voltage constant for the intermediate frequency carrier frequency but to allow changes in clipping level with slow changes in signal input amplitude.

While other ways of applying bias to the grid 18 of the tube 10 may be used, the advantage of the self-biasing by the cathode resistor 12, as shown, is that it prevents either positive or negative grid limiting of the signal side bands due to slow changes in the carrier level. This desirable operation is due to the fact that, with self-biasing, the bias depends upon the average plate current produced by the signal and so varies with the amplitude of the signal. Any sort of fixed bias will not vary and, when the signal level is varied, a portion of the desired modulation might well be sliced off along with the undesired carrier; that is, with fixed bias, the positive excursion of the incoming signal might drop below the bias level 34 if this did not drop along with the incoming signal.

It can be seen that, with the use of this type of clipped amplifier at an early stage of the receiver of slightly modulated carrier voltage, the effect of microphonics and similar noises generated in subsequent stages is reduced. This reduction is due to a lowered carrier level.

Figure 4:
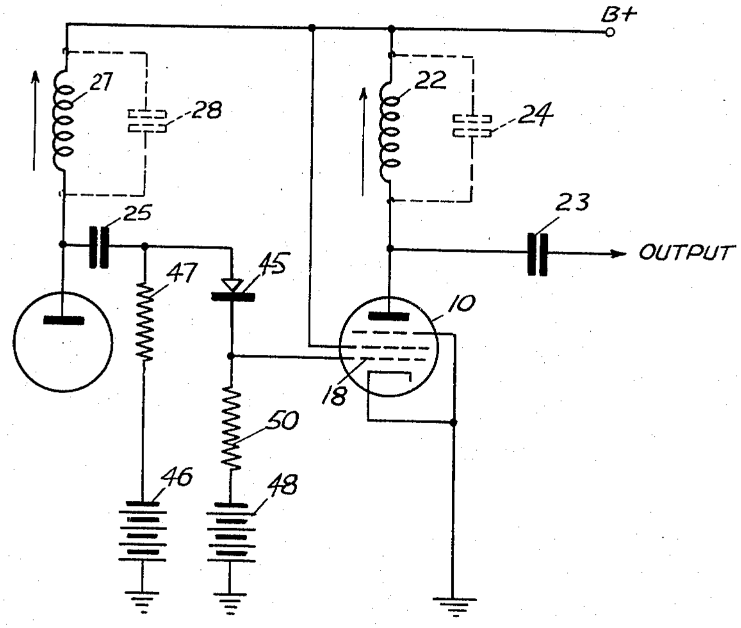
Fig. 4 is a schematic diagram of another embodiment of the invention.

Fig. 4 shows how the same clipping action may be obtained by connecting a rectifier 45 between the grid 18 of the tube 10 and the coupling capacitor 25. The anode of rectifier 45 is connected to a source of negative potential 46 through a resistor 47, and the cathode of the rectifier 45 is connected to a source of equal or less negative potential 48 through resistor 50. The cathode resistor 12 and the capacitor 13 of Fig. 1 are omitted.

In operation, when the signal envelope is sufficiently positive to counteract the negative potential supplied by the source 46, two bolts, for example, and represented by the line 34 in Fig. 2, the rectifier 45 conducts as its cathode terminal is at the negative potential of the source 48, two bolts, or less, which is also the fixed negative bias on the grid 18 of the tube 10 and the tube conducts because a positive potential developed across the resistor 50 when 45 conducts overcomes the negative bias on grid 18 and causes the tube 10 to conduct to give an amplified signal 40 at the output. As before, only the upper portion of the envelope 30 is amplified to vary the plate current along the envelope 40 which produces a modulated wave with much greater percentage modulation, as shown in Fig. 3. The rectifier 45 may be any type of unidirectional conductive device, such as a crystal or a diode, and, if a diode, may be either of the vacuum or gaseous type.

Figure 5:
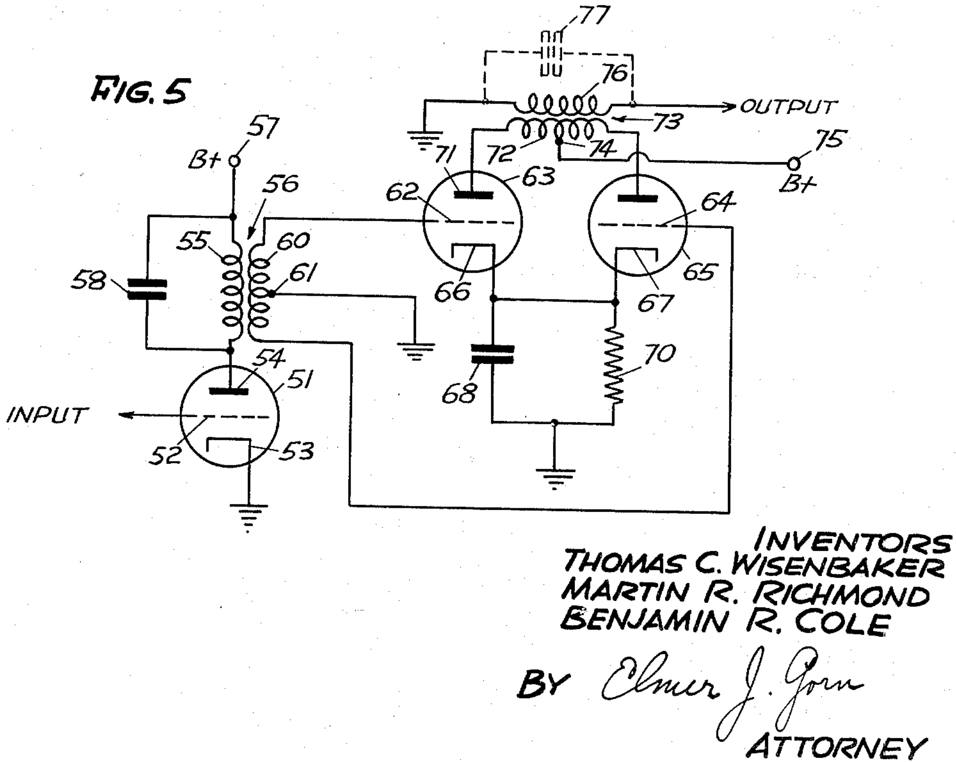
Fig. 5 is a schematic diagram of still another embodiment of the invention.

Fig. 5 shows how two stages, such as that shown in Fig. 1, can be arranged in push-pull. A driving tube 51 has its grid 52 coupled to the signal source. The cathode 53 of this tube 51 is connected to ground. The plate 54 is connected through the primary 55 of a transformer 56 to a source of positive potential 57. A capacitor 58 is connected across this primary 55. The secondary 60 of the transformer 56 has a center tap 61 connected to ground. One terminal of this secondary 60 is connected to the grid 62 of a triode 63. The other terminal of the secondary 60 is connected to the grid 64 of a triode 65. The cathodes 66 and 67 of triodes 63 and 65 are both connected to ground over the parallel combination of the capacitor 68 and resistor 70. The plate 71 of the tube 63 is connected to one terminal of the primary 72 of an output transformer 73. The center tap 74 of the primary 72 is connected to a source of positive potential 75. The secondary 76 of the transformer 73 is coupled to the output.

In operation the signal applied to the grid 52 of the tube 51 appears in the secondary winding 60 of the transformer 56 with the original positive alternations appearing as positive at the grid 62 of tube 63 and the originally negative alternations appearing as positive at the grid 64 of the tube 65. The resistor 70 applies a high negative potential to both grids 62 and 64 that is beyond the cutoff of both tubes, which may be a dual triode. The capacitor 68 performs the same function as the capacitor 13 in Fig. 1. The signal appears as current pulses in the primary 72 of the transformer 73 and is recreated in the tuned circuit formed by the secondary winding 76 and the stray capacity associated with it represented by the shunting capacitor 77 shown in dotted lines with an increased percentage of modulation. The advantage of this circuit is that the amplitude modulation of both the positive and negative alternations is increased.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In an amplifier for signals with a small degree of modulation having an input and an output, the combination of an electron discharge device having a plate, a grid, and a cathode, a unidirectional conductor connected in series between the input and the grid of said electron discharge device, means to apply the modulated signal to the grid through the unidirectional conductor so that substantially only the modulated portion of the signal of one polarity above a predetermined level is applied to the grid comprising a first source of biasing potential of a polarity opposite to that of the portion of the signal to be amplified applied to the input side of said unidirectional conductor and a second source of biasing potential of the same polarity as said first source equal or less in magnitude than said first source applied to the output side of said unidirectional conductor, and resonant means in the plate to cathode circuit of said electron discharge device to recreate said modulated signal in said output with a greater degree of modulation.

2. In an amplifier for signals with a small degree of modulation having an input and an output, the combination of an electron discharge device having a plate, a grid, and a cathode, a unidirectional conductor connected in series between the input and the grid of said electron discharge device, means to apply a signal with a small degree of modulation to the grid through the unidirectional conductor so that substantially only the modulated portion of the positive part of said signal above a predetermined level is applied to the grid comprising a first source of biasing potential of a polarity opposite to that of the portion of the signal to be amplified applied to the input side of said unidirectional conductor and a second source of biasing potential of the same polarity as said first source equal or less in magnitude than said first source applied to the output side of said unidirectional conductor, and resonant means in the plate to cathode circuit of said electron discharge device to recreate said modulated signal in said output with a greater degree of modulation.

References Cited in the file of this patent

UNITED STATES PATENTS

| | | |
|---|---|---|
| 2,235,550 | Fyler | Mar. 18, 1941 |
| 2,346,020 | Gillespie | Apr. 4, 1944 |
| 2,403,245 | Slaymaker | July 2, 1946 |
| 2,435,547 | Nikis | Feb. 3, 1948 |
| 2,437,839 | Slaymaker | Mar. 16, 1948 |
| 2,562,476 | Rado | July 31, 1951 |